(12) United States Patent
Gattu et al.

(10) Patent No.: US 10,104,538 B2
(45) Date of Patent: Oct. 16, 2018

(54) APPARATUS AND METHOD FOR PROVIDING A MOBILE DEVICE MANAGEMENT SERVICE

(71) Applicant: Samsung Electronics Co., Ltd., Suwon-si, Gyeonggi-do (KR)

(72) Inventors: Balasubrahmanyam Gattu, Cupertino, CA (US); Hashir Khan, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 14/250,850

(22) Filed: Apr. 11, 2014

(65) Prior Publication Data

US 2015/0215772 A1 Jul. 30, 2015

Related U.S. Application Data

(60) Provisional application No. 61/931,844, filed on Jan. 27, 2014.

(51) Int. Cl.
*G06F 7/04* (2006.01)
*G06F 15/16* (2006.01)
*G06F 17/30* (2006.01)
*H04L 29/06* (2006.01)
*H04W 8/24* (2009.01)
*H04W 12/06* (2009.01)
*H04L 29/08* (2006.01)
*H04W 12/08* (2009.01)
(Continued)

(52) U.S. Cl.
CPC ........... *H04W 8/245* (2013.01); *H04L 67/303* (2013.01); *H04L 67/34* (2013.01); *H04W 12/06* (2013.01); *H04W 12/08* (2013.01);

*H04W 4/001* (2013.01); *H04W 4/50* (2018.02); *H04W 8/265* (2013.01); *H04W 88/02* (2013.01)

(58) Field of Classification Search
CPC ...... H04L 41/0806; H04L 67/10; H04W 4/00; H04W 12/06; H04W 12/08
USPC ........................................................ 455/418
See application file for complete search history.

(56) References Cited

U.S. PATENT DOCUMENTS 6,389,464 B1 * 5/2002 Krishnamurthy ... H04L 41/0213
709/220
9,065,683 B2 * 6/2015 Wolosewicz et al.
(Continued)

FOREIGN PATENT DOCUMENTS

EP 1 473 873 A2 11/2004
WO WO 2013/175560 A1 * 11/2013 ............. G06F 13/00

OTHER PUBLICATIONS

Citrix, Citrix XenMobile Technology Overview : White Paper, Citrix White papers on line, Jul. 31, 2012, pp. 1-14, XP055098728, Retrieved from the Internet: URL: https://www.insight.com/content/dam/insight/en_US/pdfs/citrix/xenmobile-tech-overview.pdf.

*Primary Examiner* — Rafael Pérez-Gutiérrez
*Assistant Examiner* — Mark G. Pannell
(74) *Attorney, Agent, or Firm* — Jefferson IP Law, LLP

(57) ABSTRACT

An apparatus and method for providing a Mobile Device Management (MDM) service are provided. The method includes transmitting a request for an MDM server to a gateway server, the request including identification information, receiving, in response to the request, information relating to an MDM server corresponding to the identification information, and enrolling a device with the MDM server.

15 Claims, 5 Drawing Sheets

(51) Int. Cl.
*H04W 4/50* (2018.01)
*H04W 4/00* (2018.01)
*H04W 8/26* (2009.01)
*H04W 88/02* (2009.01)

(56) References Cited

U.S. PATENT DOCUMENTS

| | | | |
|---|---|---|---|
| 9,332,424 B2* | 5/2016 | Logan | H04W 8/245 |
| 9,705,919 B1* | 7/2017 | Jacobsen | H04L 63/20 |
| 2005/0060361 A1* | 3/2005 | Chatrath et al. | 709/200 |
| 2005/0289229 A1* | 12/2005 | Kim | 709/223 |
| 2006/0272014 A1* | 11/2006 | McRae et al. | 726/12 |
| 2008/0114855 A1 | 5/2008 | Welingkar et al. | |
| 2009/0287667 A1* | 11/2009 | Kannan | G06F 17/30569 |
| 2010/0070513 A1* | 3/2010 | Wang | G06F 17/30607 |
| | | | 707/752 |
| 2010/0130167 A1* | 5/2010 | Bennett | H04L 63/30 |
| | | | 455/411 |
| 2011/0252240 A1 | 10/2011 | Freedman et al. | |
| 2013/0007245 A1 | 1/2013 | Malik et al. | |
| 2013/0007848 A1 | 1/2013 | Chaskar et al. | |
| 2013/0031608 A1* | 1/2013 | Alfano et al. | 726/3 |
| 2013/0178190 A1 | 7/2013 | Celt, Jr. et al. | |
| 2013/0247166 A1 | 9/2013 | Freedman et al. | |
| 2013/0263212 A1 | 10/2013 | Faltyn et al. | |
| 2014/0007183 A1 | 1/2014 | Qureshi et al. | |
| 2014/0012993 A1* | 1/2014 | Jallapelli | H04L 29/08153 |
| | | | 709/226 |
| 2014/0282922 A1* | 9/2014 | Iwanski | H04L 63/0428 |
| | | | 726/5 |
| 2014/0365624 A1* | 12/2014 | Whittemore et al. | 709/221 |
| 2015/0006647 A1* | 1/2015 | Steinberg et al. | 709/206 |
| 2015/0089673 A1* | 3/2015 | Beckman et al. | 726/29 |
| 2015/0095176 A1* | 4/2015 | Schilling et al. | 705/26.1 |
| 2015/0111559 A1* | 4/2015 | Leaver | H04W 8/22 |
| | | | 455/418 |
| 2015/0113034 A1* | 4/2015 | Tome et al. | 709/201 |
| 2015/0188777 A1* | 7/2015 | Frost | H04L 67/34 |
| | | | 709/223 |

* cited by examiner

APPARATUS AND METHOD FOR PROVIDING A MOBILE DEVICE MANAGEMENT SERVICE

CROSS-REFERENCE TO RELATED APPLICATION(S)

This application claims the benefit under 35 U.S.C. § 119(e) of a U.S. Provisional application filed on Jan. 27, 2014 in the U.S. Patent and Trademark Office and assigned Ser. No. 61/931,844, the entire disclosure of which is hereby incorporated by reference.

TECHNICAL FIELD

The present disclosure relates to an apparatus and method for providing a service. More particularly, the present disclosure relates to an apparatus and method for providing a Mobile Device Management (MDM) service.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Previously, employees of an enterprise, such as a company, educational institution, government agency, or the like, were issued devices, such as portable phones or pagers, by the enterprise. This allowed the enterprise to control the security of the devices. However, with the development and proliferation of smartphones, users are desiring to use their own phones instead of relying upon enterprise-issued devices.

The above information is presented as background information only to assist with an understanding of the present disclosure. No determination has been made, and no assertion is made, as to whether any of the above might be applicable as prior art with regard to the present disclosure.

Accordingly, there is a need for an apparatus and method for providing an improved user interface while reducing power consumption in a mobile terminal.

SUMMARY

Aspects of the present disclosure are to address at least the above-mentioned problems and/or disadvantages and to provide at least the advantages described below. Accordingly, an aspect of the present disclosure is to provide an apparatus and method for providing a Mobile Device Management (MDM) service.

In accordance with an aspect of the present disclosure, a method to provide a Mobile Device Management (MDM) service is provided. The method includes transmitting a request for an MDM server to a gateway server, the request including identification information, receiving, in response to the request, information relating to an MDM server corresponding to the identification information, and enrolling a device with the MDM server.

In accordance with another aspect of the present disclosure, an MDM system is provided. The system includes an electronic device having a universal MDM client module installed therein, a plurality of MDM servers, and a Global Gateway Server configured to receive information from the plurality of MDM servers, to store the received information in profiles corresponding to each of the plurality of MDM servers, to search for a stored profile corresponding to identification information received from the electronic device, and to transmit the stored profile to the electronic device in response to the receipt of the identification information.

In according with another aspect of the present disclosure, a mobile device is provided. The mobile device includes a communication unit configured to communicate with a global gateway server and a Mobile Device Management (MDM) server, a universal MDM client module configured to transmit identification information to the global gateway server, to receive an invocation instruction from the global gateway in response to the request, the invocation instruction related to the MDM server, and to enroll the mobile device in the MDM server, and a controller configured to control operations of the communication unit and the universal MDM client module.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
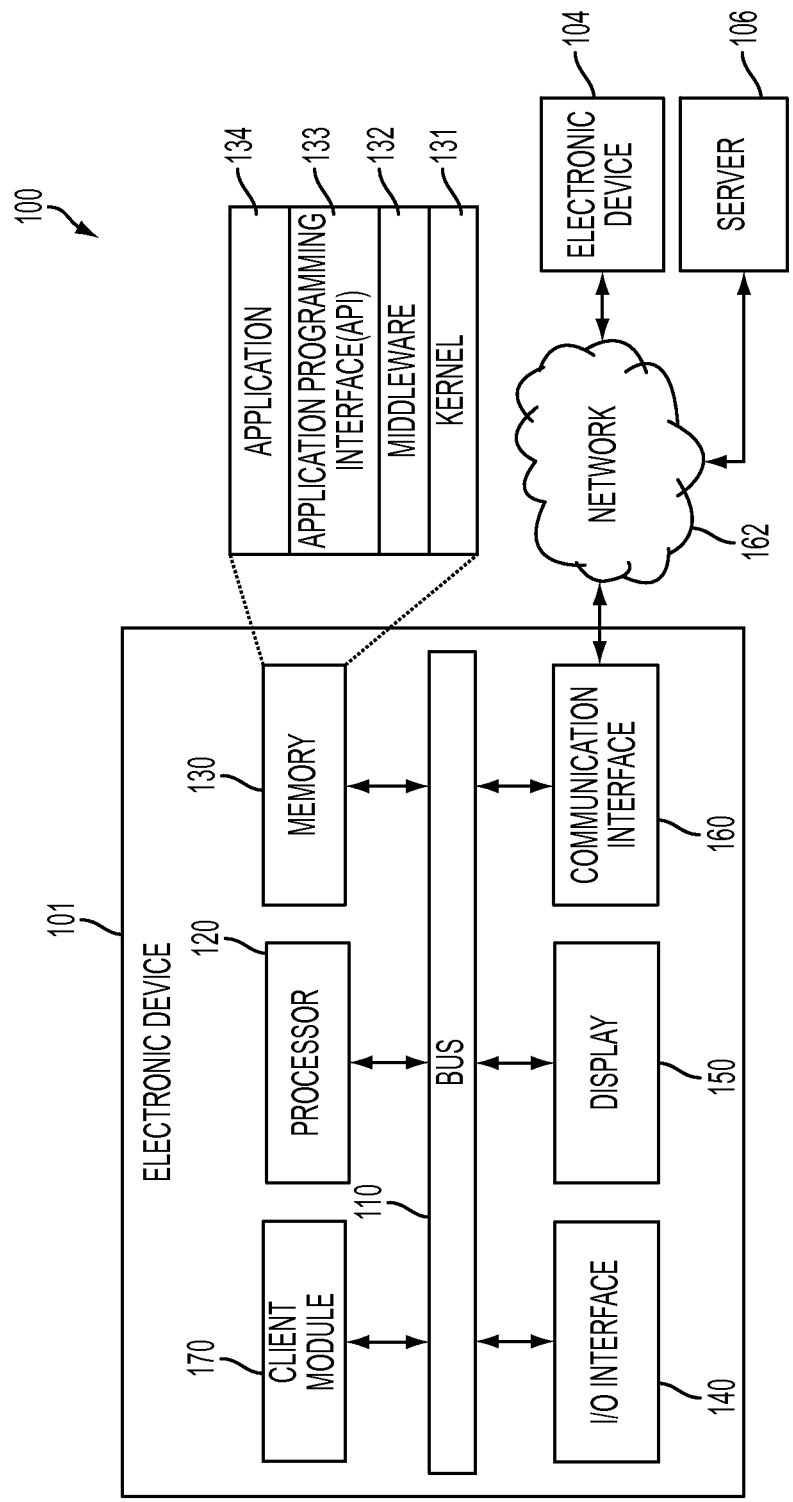
FIG. 1 illustrates a network environment including an electronic device according to various embodiments of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the present disclosure are provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to the related art, a user employed at, for example, Acme Corporation, needs to download and install an MDM application. These applications are typically available on an app store, such as Google Play for Android, or the Apple Store for iPhone. Thus, the user needs to have an account with the appropriate app store in order to download and install the correct MDM applications However, many different MDM vendors offer applications through these stores. As a result, the user may accidentally select the wrong application, which could lead to a security breach. Moreover, many users are not technically inclined, and complicated instruction may be difficult for the user to follow. As a result, the user's productivity could be negatively impacted as a result of the failure to install the MDM application, or a security breach may occur due to the MDM application not being installed or not being configured properly.

Various embodiments of the present disclosure include an apparatus and method for global Mobile Device Management (MDM) server discovery. According to exemplary embodiments of the present invention, a universal client module interacts with a gateway server to provide a single point for installing and/or invoking an MDM application.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a client module 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the client module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the client module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., by scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/por the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instatn messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the client module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the client module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/or the like.

The client module 170 may, for example, process at least a part of information received from other components (e.g., the processor 120, the memory 130, the I/O interface 140, the communication interface 160, and/or the like), and provide various information, services, and/or the like to the user in various manners. For example, the client module 170 may control via the processor 120 or independently at least some of the functions of the electronic device 101 to communicate or connect to another electronic device (e.g., the electronic device 104, the server 106, and/or the like). The client module 170 may be installed or be incorporated in an electronic device (e.g., electronic devices 101, 104 or server 106) and provide functionalities for receiving a service (e.g., an MDM service) provided by a service provider. The client module 170 is described in more detail below with respect to FIGS. 2 and 3.

The present disclosure may describe the various embodiments by referring to a universal MDM client module, an MDM server, or an MDM service. However, the various embodiments of the present disclosure are not limited thereto and other types of modules, electronic devices, servers or services may be applicable or used.

Figure 2:
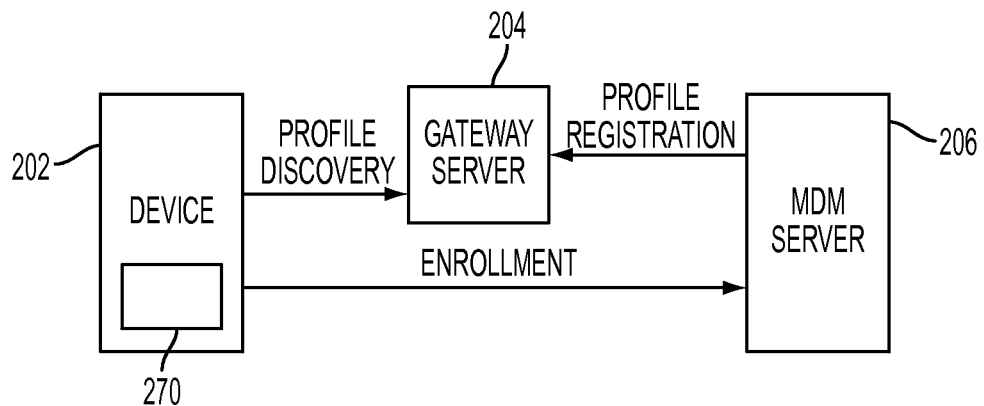
FIG. 2 illustrates a block diagram of a Mobile Device Management (MDM) system including a single device and a single MDM server according to various embodiments of the present disclosure.

FIG. 2 illustrates a block diagram of a Mobile Device Management (MDM) system including a single device and a single MDM server according to various embodiments of the present disclosure.

Referring to FIG. 2, the MDM system includes a device 202 (e.g., electronic device 101) having a universal MDM client module 270 (e.g., client module 170), a Global Gateway Server 204 (e.g., electronic device 101, electronic device 104 or server 106), and the MDM server 206 (e.g., electronic device 101, electronic device 104 or server 106). The device 202 including the universal MDM client module 270 and the Global Gateway Server may provide MDM functionalities to the systems shown in FIGS. 2 and 3.

Figure 3:
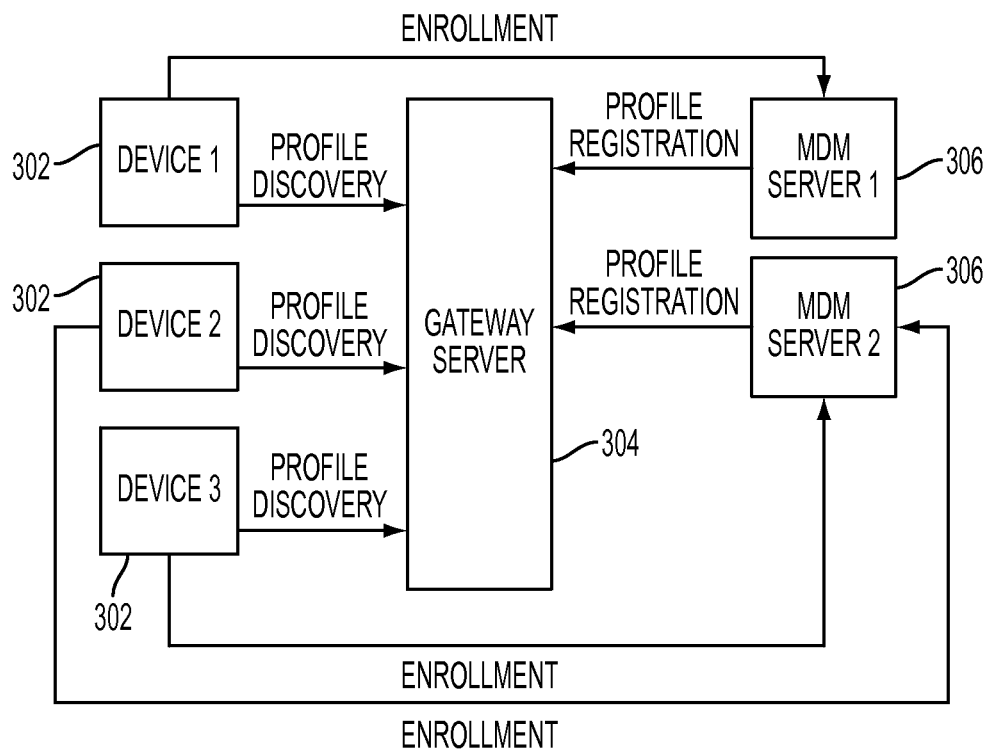
FIG. 3 illustrates an MDM system including multiple devices and multiple MDM servers according to various embodiments of the present disclosure.

FIG. 3 illustrates an MDM system including multiple devices and multiple MDM servers according to various embodiments of the present disclosure Referring to FIG. 3, the MDM system includes multiple devices 302 (e.g., electronic devices 101) and multiple MDM servers 306 (e.g., electronic devices 101, electronic devices 104 or servers 106). The MDM servers 306, for example, may be associated with different MDM services.

The devices 302 may include universal MDM client modules 370 (e.g., the client module 170). The universal MDM client modules 370, in conjunction with the Global Gateway Server 304 (e.g., electronic device 104 or server 106), may provide MDM functionalities to multiple devices to work with the multiple MDM servers 306, without requiring an additional application for each server (e.g., without requiring different client modules for different MDM servers) and without requiring an extensive enrollment process.

According to an exemplary embodiment of the present invention, the universal MDM client module 370 may be pre-installed on the user's device. Alternatively, the universal MDM client module 370 may be available on an application store such as Google Play or the Apple App Store, or from another source.

The universal MDM client module 370 may be accessible through a settings menu of the user's device. For example, the user may invoke the universal MDM client module 370 by accessing a settings menu for the device and selecting the universal MDM client module 370 from, e.g., a menu, drop-down list, or the like. Selecting the universal MDM client module 370 from the settings list may trigger the various operations described below.

The Global Gateway Server 304 assists in the enrollment process. The Global Gateway Server 304 receives identification information from the universal MDM client module 370. This identification information may be, for example, the domain of an E-mail address. The Global Gateway Server identifies the appropriate MDM application based on the identifying information, and then invokes the MDM application on the user's device. At this point, the universal MDM client communicates with a corresponding MDM server 306 to complete the enrollment/installation process.

Figure 4:
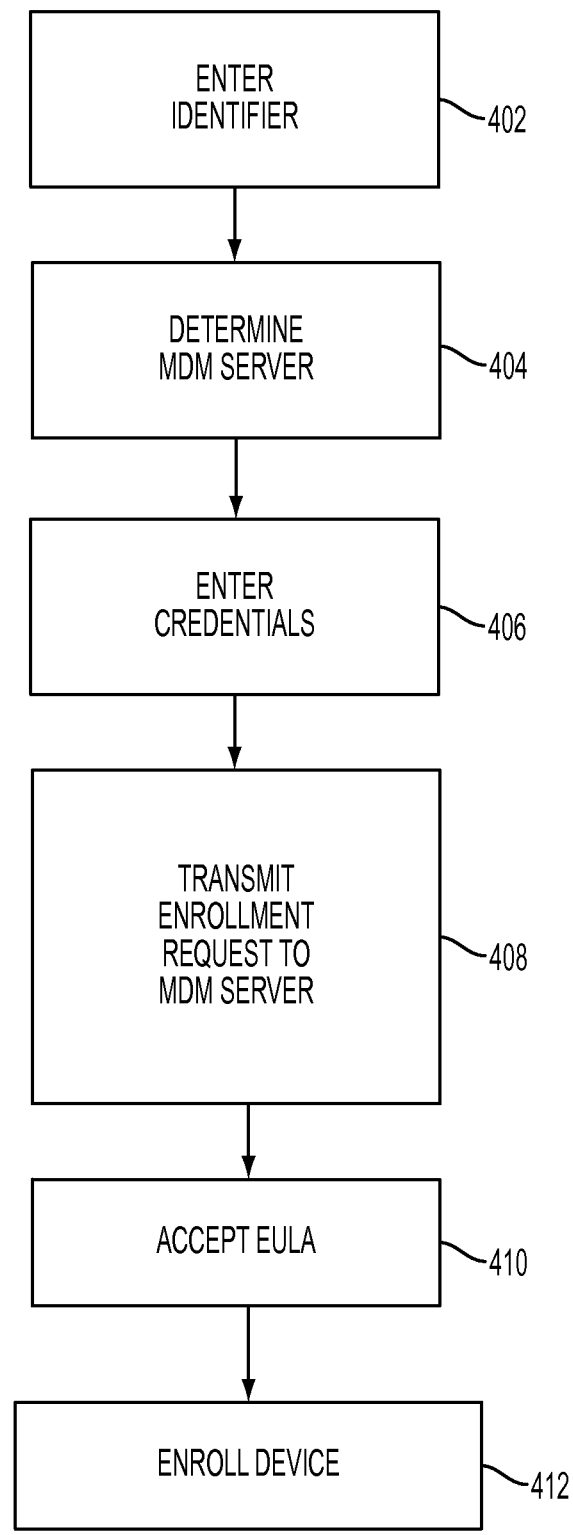
FIG. 4 illustrates example enrollment operations according to various embodiments of the present disclosure.

FIG. 4 illustrates example enrollment operations according to various embodiments of the present disclosure. The enrollment operations may be performed, for example, at the electronic device 101, electronic device 202, electronic devices 304 or any system described above with respect to FIG. 2 or 3.

Referring to FIG. 4, for example, a user employed at the Acme Corporation wants to activate an MDM service on the user's mobile device. Accordingly, at block 402, the user may enter an identifier via a universal MDM client module (e.g., client module 170) installed on an electronic device (e.g., electronic devices 202 or 302). The identifier may be, for example, an email address, such as user@acme.example. The user does not need to know any information about the MDM server.

At block 404, an MDM server (e.g., MDM servers 206 or 306) corresponding to the identifier (e.g., the E-mail address) may be determined. The corresponding MDM server may be determined via, for example, a discovery operation. The determination at block 404 may be performed, for example, at a gateway server (e.g., gateway servers 204 or 304). For example, the gateway server may receive the E-mail address user@acme.example, and determine that the user wants to invoke the MDM application corresponding to the acme.example domain. The Global Gateway Server 304 may include a profile for Acme Corporation (as well as other enterprises) indicating which MDM server (and corresponding MDM application) Acme Corporation uses. As described below, the profile may include the domain of the enterprise (e.g., acme.example) as well as information indicating the appropriate MDM server.

At block 406, the user may enter credentials for enrollment with the MDM server via, for example, the universal MDM client module. The credentials may be entered for example, via an I/O module (e.g., I/O module 140). At block 408, the enrollment request may be transmitted to the MDM server determined at block 404. The enrollment request may include the credentials entered at block 406. At block 410, an End User License Agreement (EULA) or other terms of service may be provided to the user for agreement.

At block 412, the device may be enrolled with the MDM server. As part of the enrollment process, an MDM application may be downloaded to the user's device to configure the device for the MDM service. This may include activating encryption, enforcing a password policy, and other security features provided by the MDM service. According to another embodiment of the present invention, these services may be provided through the universal MDM client 370 instead of via a separate application. In this case, the MDM server may control the universal MDM client 370 to configure the security policy for the user's device according to the MDM server's configuration.

Figure 5:
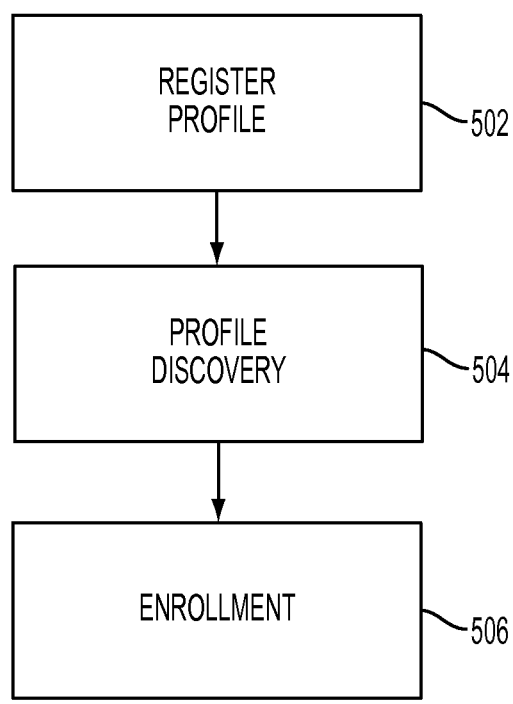
FIG. 5 illustrates example enrollment operations according to various embodiments of the present disclosure.

FIG. 5 illustrates example enrollment operations according to various embodiments of the present disclosure.

Referring to FIG. 5, the operations may include three operations such as, for example, profile registration, profile discovery, and enrollment. The enrollment operations may be performed, for example, at the electronic device 101, electronic device 202, electronic devices 304 or any system or their subsystems described above with respect to FIG. 2 or 3.

At block 502, a profile for an enterprise (e.g., Acme Corporation) may be registered. For example, an enterprise may register a profile including information about a corresponding MDM Server (e.g., MDM servers 206 or 306) with a Global Gateway Server (e.g., Global Gateway Servers 204 or 206). This information may include an enterprise domain (e.g., acme.example), MDM server details (e.g., Uniform Resource Locator (URL)), security certificates, user authentication details, or other types of information that may be used in providing MDM functionalities or registering an electronic device with the MDM server. As the profile information is stored in the Global Gateway Server, the user is not required to obtain this information. Instead, the Global Gateway Server provides this information in response to the request from the universal MDM client module.

At block 504, profile discovery may be performed. During profile discovery, a user may activate the universal MDM client 370 and enter an identifier such as, for example, an enterprise E-mail address (e.g., user@acme.example) into a Universal MDM Client (e.g., universal MDM client 170, 270 or 370). The electronic device to be enrolled may connect to the Global Gateway Server and transmit the identifier to the Global Gateway Server. The Global Gateway Server may search for a profile matching the identifier. For example, a search may be made for a profile matching a domain specified in the E-mail address (e.g., acme.example). Information contained in the matching profile (if any) may be returned to the electronic device to be enrolled. Alternatively, the Global Gateway Sever may invoke the MDM application via the universal MDM client 370.

At block 506, enrollment may be performed. The electronic device to be enrolled may obtain credentials from the user based on, for example, the user authentication details included in the profile received from the Global Gateway Server. The electronic device may connects to the MDM server specified in the profile using the server details included in the profile, and transmit the user credentials to the MDM server. When the MDM server authenticates the user, the enrollment may be completed. At this time, the MDM server may configure the user's device via the universal MDM client 370 or may install an MDM application on the user's device. The configuration may include setting up a password policy, activating data encryption, and adjusting or activating other features or settings.

According to various embodiments of the present disclosure, one client (e.g., client module 170) may be used to support MDM functionalities for multiple devices and multiple MDM Servers. For example, the Global Gateway Server (e.g., Global Gateway Servers 204 or 304) may identify an appropriate MDM Server, for example, based on an identifier received from the user. The identifier may be used to obtain the MDM server profile from the Global Gateway Server, to provide MDM functionalities corresponding to the MDM server.

According to various embodiments of the present disclosure, the user may provide an identifier (e.g., an Enterprise E-mail address) and authentication credentials and enroll with the appropriate MDM service by providing the information to the Global Gateway Server. This information may be included in the profile stored in the Global Gateway Server and retrieved based on the supplied identifier.

Figure 6:
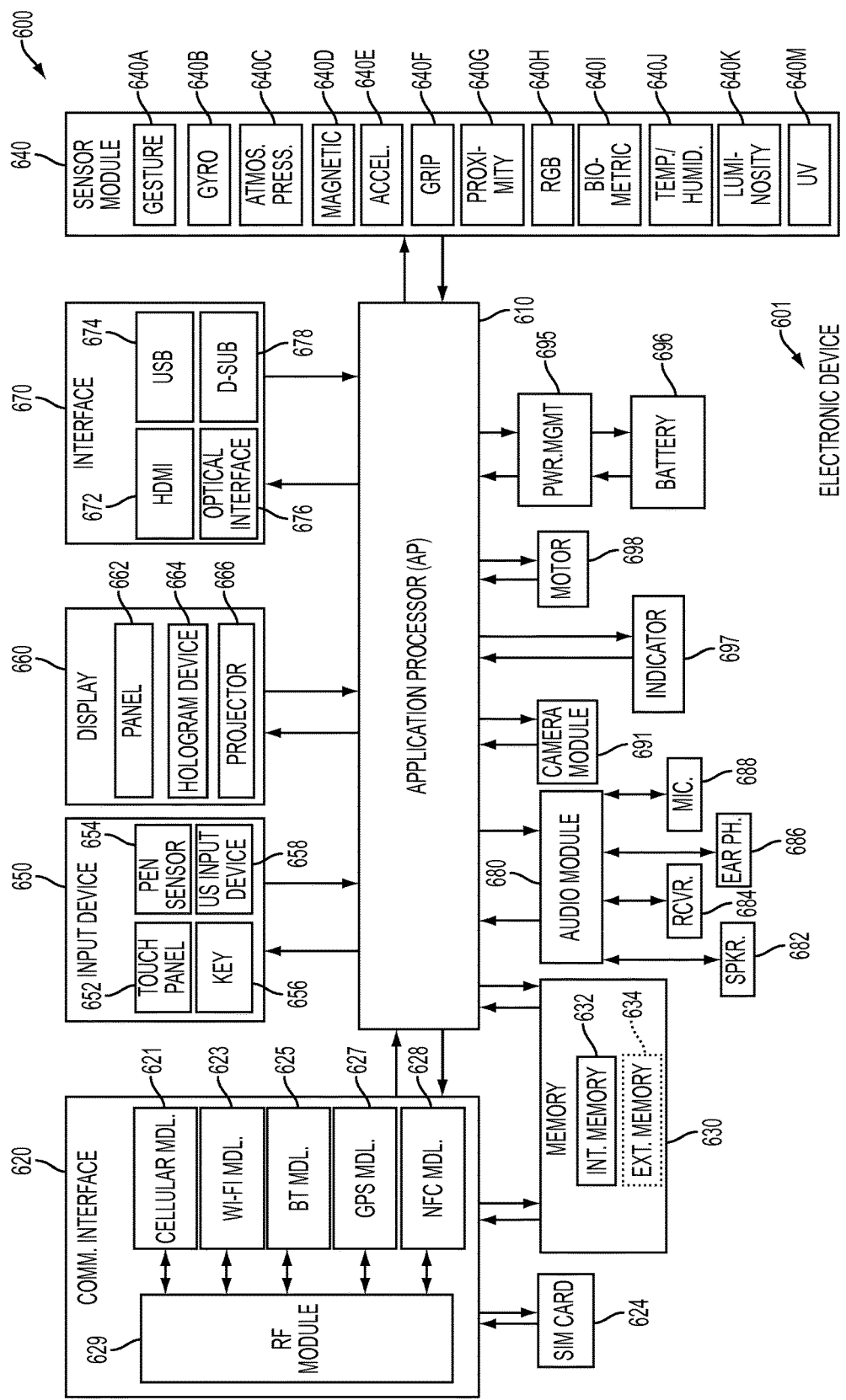
FIG. 6 illustrates a block diagram of hardware according to various embodiments of the present disclosure.

FIG. 6 illustrates a block diagram of hardware according to various embodiments of the present disclosure.

Referring to FIG. 6, hardware 601 may be, for example, a part or all of the electronic device 101. Referring to FIG. 8, the hardware 601 may include one or more Application Processors (AP) 610, a communication module 620, a Subscriber Identification Module (SIM) card 624, a memory 630, a sensor module 640, an input module 650, a display module 660, an interface 670, an audio module 680, a camera module 691, a power management module 695, a battery 696, an indicator 697, a motor 698, and/or the like.

The AP 610 may control one or more hardware or software components that are connected to AP 610, perform processing or computation of data (including multimedia data), and/or the like. As an example, the AP 610 may be implemented as a System-on-Chip (SoC). The AP 610 may include a Graphics Processing Unit (GPU) (not shown).

The communication module 620 (e.g., the communication interface 160) may transmit and receive data in communications between the electronic device 101 and other electronic devices (e.g., the electronic device 104, the server 106, and/or the like). As an example, the communication module 620 may include one or more of a cellular module 621, a Wi-Fi module 623, a Bluetooth module 625, a GPS module 627, a NFC module 628, a Radio Frequency (RF) module 629, and/or the like.

The cellular module 621 may provide services such as, for example, a voice call, a video call, a Short Messaging Service (SMS), interne service, and/or the like, via a communication network (e.g., LTE, LTE-A, CDMA, WCDMA, UMTS, WiBro, GSM, and/or the like). As an example, the cellular module 621 may differentiate and authorize electronic devices within a communication network using a Subscriber Identification Module (SIM) card (e.g., the SIM card 624). According to various embodiments of the present disclosure, the cellular module 621 may perform at least a part of the functionalities of the AP 610. For example, the cellular module 621 may perform at least a part of multimedia control functionality.

According to various embodiments of the present disclosure, the communication interface 620 and/or the cellular module 621 may include a Communication Processor (CP). As an example, the cellular module 621 may be implemented as SoC.

Although FIG. 8 illustrates components such as the cellular module 621 (e.g., CP), the memory 630, the power management module 695 as components that are separate from the AP 610, according to various embodiments of the present disclosure, the AP 610 may include, or be integrated with, one or more of the foregoing components (e.g., the cellular module 621).

According to various embodiments of the present disclosure, the AP 610, the cellular module 621 (e.g., CP), and/or the like, may process instructions or data received from at least one of non-volatile memory or other components by loading in volatile memory. The AP 610, the cellular module 621, the communication interface 620, and/or the like, may store at non-volatile memory at least one of data that is received from at least one of other components or data that is generated by at least one of the other components.

Each of the Wi-Fi module 623, the Bluetooth module 625, the GPS module 627, the NFC module 628, and/or the like may, for example, include one or more processors that may process data received or transmitted by the respective modules. Although FIG. 8 illustrates the cellular module 621, the Wi-Fi module 623, the Bluetooth module 625, the GPS module 627, and the NFC module 628 as separate blocks, according to various embodiments of the present disclosure, any combination (e.g., two or more) of the cellular module 621, the Wi-Fi module 623, the Bluetooth module 625, the GPS module 627, the NFC module 628, and/or the like may be included in an Integrated Chip (IC) or an IC package. For example, at least some of the processors corresponding to the respective cellular module 621, the Wi-Fi module 623, the Bluetooth module 625, the GPS module 627, the NFC module 628, and/or the like, may be implemented as a single SoC. For example, a CP corresponding to the cellular module 621 and a Wi-Fi processor corresponding to Wi-Fi module 623 may be implemented as a single SoC.

The RF module 629 may, for example, transmit and receive RF signals. Although not shown, the RF module 629 may include a transceiver, a Power Amp Module (PAM), a frequency filter, a Low Noise Amplifier (LNA), and/or the like. The RF module 629 may include one or more components for transmitting and receiving Electro-Magnetic (EM) waves (e.g., in free space or the like) such as, for example, conductors or conductive wires. Although FIG. 8 illustrates that the cellular module 621, the Wi-Fi module 623, the Bluetooth module 625, the GPS module 627, and the NFC module 628 are sharing one RF module 629, according to various embodiments of the present disclosure, at least one of the cellular module 621, the Wi-Fi module 623, the Bluetooth module 625, the GPS module 627, the NFC module 628, and/or the like may transmit and receive RF signals via a separate RF module.

The SIM card 624 may be a card implementing a SIM, and may be configured to be inserted into a slot disposed at a specified location of the electronic device. The SIM card 624 may include a unique identifier (e.g., Integrated Circuit Card IDentifier (ICCID)) subscriber information (e.g., International Mobile Subscriber Identity (IMSI)), and/or the like.

The memory 630 (e.g., memory 130) may include an internal memory 632, an external memory 634, or a combination thereof.

According to various embodiments of the present disclosure, the internal memory 632 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 632 may be a Solid State Drive (SSD). As an example, the external memory 634 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 634 may be operatively coupled to electronic device 601 via various interfaces. According to various embodiments of the present disclosure, the electronic device 601 may include recording devices (or recording media) such as, for example, Hard Disk Drives (HDD), and/or the like.

The sensor module 640 may measure physical/environmental properties detect operational states associated with electronic device 601, and/or the like, and convert the measured and/or detected information into signals such as, for example, electric signals or electromagnetic signals. As an example, the sensor module 640 may include at least one of a gesture sensor 640A, a gyro sensor 640B, an atmospheric pressure sensor 640C, a magnetic sensor 640D, an accelerometer 640E, a grip sensor 640F, a proximity sensor 640G, an RGB sensor 640H, a biometric sensor 640I, a temperature/humidity sensor 640J, a luminosity sensor 640K, a Ultra Violet (UV) sensor 640M, and/or the like. The sensor module 640 may detect the operation state of the electronic device and/or measure physical properties, and convert the detected or measured information into electrical signals. Additionally or alternatively, the sensor module 640 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 640 may also include control circuitry for controlling one or more sensors included therein.

The input module 650 may include a touch panel 652, a (digital) pen sensor 654, a key 656, an ultrasonic input device 658, and/or the like.

As an example, the touch panel 652 may detect touch input using capacitive, resistive, infrared, ultrasonic methods, and/or the like. The touch panel 652 may also include a touch panel controller (not shown). As an example, a capacitive-type touch panel may detect proximity inputs (e.g. hovering input) in addition to, or as an alternative to, physical touch inputs. The touch panel 652 may also include a tactile layer. According to various embodiments of the present disclosure, the touch panel 652 may provide haptic feedback to the user using the tactile layer.

As an example, the (digital) pen sensor 654 may be implemented using methods identical to or similar to receiving a touch input from a user, or using a separate detection sheet (e.g., a digitizer).

As an example, the key 656 may be a keypad, a touch key, and/or the like.

As an example, the ultrasonic input device 658 may be a device configured to identify data by detecting, using a microphone (e.g., microphone 688), ultrasonic signals generated by a device capable of generating the ultrasonic signal. The ultrasonic input device 658 may detect data wirelessly.

According to various embodiments of the present disclosure, the electronic device 601 may receive user input from an external device (e.g., a network, computer or server) connected to the electronic device 601 using the communication module 620.

The display module 660 (e.g., display 150) may include a panel 662, a hologram device 664, a projector 666, and/or the like. As an example, the panel 662 may be, for example, a Liquid-Crystal Display (LCD), an Active-Matrix Organic Light-Emitting Diode (AM-OLED) display, and/or the like. As an example, the panel 662 may be configured to be flexible, transparent, and/or wearable. The panel 662 and the touch panel 652 may be implemented as a single module. The hologram device 664 may provide a three-dimensional image. For example, the hologram device 664 may utilize the interference of light waves to provide a three-dimensional image in empty space. The projector 666 may provide image by projecting light on a surface (e.g., a wall, a screen, and/or the like). As an example, the surface may be positioned internal or external to electronic device 601. According to various embodiments of the present disclosure, the display module 660 may also include a control circuitry for controlling the panel 662, the hologram device 664, the projector 666, and/or the like.

The interface 670 may include, for example, one or more interfaces for a High-Definition Multimedia Interface (HDMI) 672, a Universal Serial Bus (USB) 674, a projector 676, or a D-subminiature (D-sub) 678, and/or the like. As an example, the interface 670 may be part of the communication interface 620. Additionally or alternatively, the interface 670 may include, for example, one or more interfaces for Mobile High-definition Link (MHL), Secure Digital (SD)/MultiMedia Card (MMC), Infrared Data Association (IrDA), and/or the like.

The audio module 680 may encode/decode sound into electrical signal, and vice versa. According to various embodiments of the present disclosure, at least a portion of audio module 680 may be part of the I/O interface 140. As an example, the audio module 680 may encode/decode voice information that is input into, or output from, the speaker 682, the receiver 684, the earphone 686, the microphone 688, and/or the like.

The camera module 691 may capture still images and/or video. According to various embodiments of the present disclosure, the camera module 691 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 695 may manage electrical power of the electronic device 601. Although not shown, the power management module 695 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 601 may include wired or wireless charging. The charger IC may charge a battery, may prevent excessive voltage or excessive current from a charger from entering the electronic device 601, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 696, and/or the like.

As an example, the battery 696 may supply power to the electronic device 601. As an example, the battery 696 may be a rechargeable battery, a solar battery, and/or the like.

The indicator 697 may indicate one or more states (e.g., boot status, message status, charge status, and/or the like) of the electronic device 601 or a portion thereof (e.g., AP 610). Motor 698 may convert an electrical signal into a mechanical vibration.

Although not shown, the electronic device 601 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method to provide a Mobile Device Management (MDM) service comprising:
   transmitting, from a universal MDM client application installed on a device, a request for an MDM server to a gateway server controlled by an entity, the request including identification information of an enterprise other than the entity;
   receiving, in response to the request, information relating to an MDM server corresponding to the identification information of the enterprise;
   enrolling the device with the MDM server; and
   configuring the device for MDM, wherein the information relating to the MDM server is stored in a profile corresponding to the enterprise, wherein the profile includes a domain of the enterprise, identification information of the MDM server, security certificates associated with the MDM server, and user authentication information of users of the MDM server, wherein the MDM server is configured to provide an MDM service to the device, wherein the universal MDM client application is configured to facilitate installation of a plurality of MDM applications, each MDM application corresponding to one of a plurality of MDM services, wherein a first MDM service of the plurality of MDM services is provided by a first MDM service provider, wherein a second MDM service of the plurality of MDM services is provided by a second MDM service provider, wherein the configuring of the device for MDM comprises activating data encryption on the device, and wherein the enrolling of the device with the MDM server comprises installing the MDM application corresponding to the MDM service provided by the MDM server.

2. The method of claim 1, wherein the identification information of the enterprise comprises a domain included in an E-mail address.

3. The method of claim 1, wherein the enrolling of the device comprises:
invoking a security function of the MDM application corresponding to the MDM service provided by the MDM server according to instructions received from the MDM server.

4. The method of claim 1, wherein the enrolling of the device comprises:
transmitting authentication information to the MDM server.

5. A non-transitory computer readable medium comprising instructions that, when executed by a mobile device, cause the mobile device to perform the method of claim 1.

6. A mobile device management (MDM) system, the system comprising:
an electronic device having a universal MDM client application installed therein;
a plurality of MDM servers, each MDM server configured to:
during an enrollment process for an MDM service, install an MDM application corresponding to the MDM service in the electronic device, and
provide the MDM service; and
a Global Gateway Server controlled by an entity and configured to:
receive information from at least one enterprise other than the entity, the information including an identification of one or more of the plurality of MDM servers that are associated with the enterprise,
store the received information in profiles corresponding to each of the at least one enterprise,
receive identification information from the electronic device, the identification information identifying one of the at least one enterprise,
search for a stored profile corresponding to the identification information of the enterprise received from the electronic device,
transmit the stored profile to the electronic device in response to the receipt of the identification information, and
configure the device for MDM, wherein the profile includes, for each of the at least one enterprise, a domain of the enterprise, identification information of the corresponding MDM server, security certificates associated with the corresponding MDM server, and user authentication information of users of the corresponding MDM server, wherein the universal MDM client application is configured to facilitate installation of a plurality of MDM applications, each MDM application corresponding to one of a plurality of MDM services, wherein a first MDM service of the plurality of MDM services is provided by a first MDM service provider, wherein a second MDM service of the plurality of MDM services is provided by a second MDM service provider, and wherein the configuring of the device for MDM comprises activating data encryption on the device.

7. The MDM system of claim 6, wherein the electronic device is further configured to:
connect to the MDM server specified in the stored profile, and
transmit authentication information to the MDM server.

8. The MDM system of claim 7, wherein the MDM server is further configured to authenticate the electronic device based on the received authentication information.

9. The MDM system of claim 6, wherein the identification information of the enterprise comprises a domain included in an E-mail address.

10. The MDM system of claim 6, wherein each of the plurality of MDM servers is further configured to download the MDM application corresponding to the MDM service to the electronic device in response to authenticating the electronic device, as part of the enrollment process.

11. A mobile device, comprising:
a communication interface configured to:
communicate with a Mobile Device Management (MDM) server configured to provide an MDM service via a global gateway server controlled by an entity and that includes a profile of an enterprise other than the entity associated with the MDM server, the profile including a domain of the enterprise, identification information of the MDM server, security certificates associated with the MDM server, and user authentication information of users of the MDM server,
transmit identification information of an enterprise to the global gateway server, and
receive an invocation instruction from the global gateway in response to the request, the invocation instruction related to the MDM server; and
at least one processor executing a universal MDM client application, the universal MDM client application configured to:
enroll the mobile device with the MDM server, the enrollment process including installing an MDM application corresponding to a service provided by the MDM server,
configure the device for MDM,
control operations of the communication interface,
wherein the universal MDM client application is further configured to facilitate installation of a plurality of MDM applications, each MDM application corresponding to one of a plurality of MDM services,
wherein a first MDM service of the plurality of MDM services is provided by a first MDM service provider, wherein a second MDM service of the plurality of MDM services is provided by a second MDM service provider, and wherein the configuring of the device for MDM comprises activating data encryption on the device.

12. The mobile device of claim 11, wherein the at least one processor is further configured to provide access to the universal MDM client application via a settings menu.

13. The mobile device of claim 11, wherein the identification information of the enterprise comprises a domain included in an E-mail address.

14. The mobile device of claim 11, wherein the at least one processor is further configured to control security policy according to instructions received from the MDM server.

15. The mobile device of claim 11, wherein the communication interface is further configured to receive the MDM application corresponding to the MDM service from the MDM server, and wherein the at least one processor is further configured to install the MDM application in a memory of the mobile device.

* * * * *